United States Patent Office 3,361,782
Patented Jan. 2, 1968

3,361,782
PROCESS FOR THE PRODUCTION OF ALKALI METALORGANIC COMPLEX COMPOUNDS OF ALUMINUM
Karl Ziegler, Kaiser-Wilhelm-Platz 1, Mulheim (Ruhr), Germany, and Heinz Hoberg, Mulheim (Ruhr), Germany; said Hoberg assignor to said Ziegler
No Drawing. Filed Apr. 7, 1967, Ser. No. 629,063
Claims priority, application Germany, May 12, 1961, Z 8,743
14 Claims. (Cl. 260—448)

ABSTRACT OF THE DISCLOSURE

Process for production of oxygen-containing alkali metal-organo aluminum complex compounds of the formula $Me[AlR_n(OR')_m]$ wherein Me is alkali metal, R is alkyl and R' is alkyl or cycloalkyl, and $m$ and $n$ is each 1 to 3 and the sum of $m$ and $n$ is 4. For example $$Na[Al(CH_3)_3OCH_3]$$

is produced by reacting Na, $Al(CH_3)_2OCH_3$, and $CH_3Cl$. By-product, for example NaCl may be formed. Reaction temperature is below 70° C. The alkali metal may be present in an amalgam containing at least 30% sodium.

---

This is a continuation-in-part application of our U.S. patent application Ser. No. 193,330 filed May 8, 1962, and now abandoned.

It is known that sodium alkyls can be produced by treating sodium in finely divided form with halogen alkyls, particularly with alkyl chlorides. The reaction requires very careful operation with observation of specific conditions because otherwise the initially formed sodium alkyls are no longer obtained but instead only the products of the so-called Wurtz synthesis. The latter are produced due to the fact that the sodium alkyls initially formed continue to react with the halogen alkyls charged. The process does not furnish the sodium alkyls in pure form but always only in mixture with sodium halide, particularly sodium chloride. Sodium alkyls, similar to sodium chloride, are insoluble in all of the solvents or suspending agents which are suitable for the reaction. Solvents such as ether which might perhaps be expected to dissolve out the sodium alkyls from mixtures with sodium chloride decompose the sodium alkyls extremely rapidly. Therefore, for the use of sodium alkyls and the study of their reactions, one is substantially always dependent on their mixtures with sodium chloride. Moreover, only a few sodium alkyls, e.g. sodium amyl, have as yet been produced by the process described. No information has been published about the production of the simplest material of this kind, i.e. sodium methyl. Experience made by the applicant has shown that sodium methyl even in mixture with sodium chloride is not readily obtainable from methyl chloride and sodium. Potassium alkyls have not been produced at all in this manner.

It has now been found that sodium and potassium alkyls, though not in free state but in combined state, viz. in form of useful metalorganic complex compounds, can be obtained from alkali metal and alkyl halide when operating in the presence of a third component which immediately binds the primarily formed alkali metal alkyl thereby protecting it from undesirable side reactions.

It is an object of the present invention to provide a process for the production of oxygen-containing alkali metal-organic complex compounds of aluminum and/or boron having the general formula $MeZR_m(OR')_n$ wherein Me is sodium or potassium, Z is aluminum or boron, R represents alkyl groups, R' represents alkyl, cycloalkyl or aryl groups which may be substituted, $m$ and $n$ are preferably integers of from 1 to 3, the sum of $m+n$ being 4, the process comprising reacting compounds of the formula $ZR_x(OR')_y$ wherein Z, R and R' are as above and $x$ is a number and preferably an integer of from 0 to 2, $y$ is a number and preferably an integer of from 1 to 3 and $x+y$ is 3, alkyl halides and sodium or potassium in accordance with the equation:

$$2Me + RHal + ZR_x(OR')_y \rightarrow MeHal + Me[ZR_n(OR')_m]$$

The process is of particular importance for the production of the sodium compounds. The radicals R in the general formulae given above may be like or different alkyl groups. Straight-chain primary alkyl groups, particularly those having up to 10 carbon atoms and preferably those having up to 5 carbon atoms and most preferably those having from 1 to 3 carbon atoms are primarily used. The radical R' is preferably an alkyl or cycloalkyl radical, particularly one having up to 10 carbon atoms.

The complex compounds produced in accordance with the invention have surprisingly been found to react with alkyl halides only at substantially higher temperatures than do the sodium alkyls. Moreover, the complex compounds of the invention have particularly high thermal stability so that they withstand particularly severe operating conditions in both the reaction and work-up without undesirable side reactions taking place. Finally, all of the complex compounds are soluble in a suitable solvent so that their separation from the insoluble sodium halide and consequently their recovery in pure state does not offer any difficulty.

It is important within the reactions of the invention that metallic sodium does not exert any influence whatever on the compounds of the type $ZR_xOR'_y$ up to temperatures far in excess of 100° C. Thus, it is exclusively available for the reaction with the alkyl halide throughout the reaction and the sodium alkyl which is formed is then immediately entrapped by the compound $ZR_xOR'_y$ to form the complex compound. The same applies to all of the members of the series, i.e. to the compounds $Al(OR')_3$, $RAl(OR')_2$, $R_2AlOR'$, $B(OR')_3$, $RB(OR')_2$, $R_2BOR'$. Accordingly, it is possible by means of the invention to convert aluminum alcoholates and boric acid esters, dialkoxy aluminum alkyls and monoalkoxy aluminum dialkyls as well as alkyl and dialkyl boric acid esters into the corresponding complex compounds.

It is desirable in carrying out the process of the invention that the alkali metal be used in finely divided form. A special embodiment of the process of the invention wherein particularly active sodium is obtained will be described hereafter.

The conditions used in carrying out the invention may be varied depending upon the particular finished product to be produced. If the reaction product to be expected is liquid or low-melting, it is possible to operate without dilution and to separate the precipitated sodium chloride simply by filtration at the end of the reaction. In other cases, it is desirable to operate in the presence of diluents, particularly suitable for this purpose being aromatic or aliphatic hydrocarbons. As a rule, aromatics are preferred for the production of complex compounds containing relatively low alkyl groups while in case of those having higher or even high alkyl groups the solubility is sufficient to permit also the use of saturated or olefinic hydrocarbons. Further excellent solvents for carrying out the process of the invention are open-chain or cyclic ethers, particularly cyclic ethers of the tetrahydrofuran type. Other suitable solvents are tertiary amines such as trimethylamine or dimethyl aniline. Further examples of the ethers mentioned above are dioxane, diethyl ether, dibutyl ether, polyether, e.g. ethyl glycol dialkyl ether and the like.

The reaction is preferably carried out at elevated temperatures, it being generally preferred to maintain temperatures below 100° C. In producing complex compounds which contain aluminum, the temperature should not exceed an upper limit of 70° C. if possible because otherwise a reaction between alkyl halides and the complex compounds formed is possible. In case of boron compounds, higher temperatures of, for example, as high as 90° C. may be used as a rule. However, it is not necessay in general to increase the temperature to these levels, the reactions proceeding rapidly and smoothly at substantially lower temperatures.

The use of the principle of the invention permits safe control of the reaction between alkyl halide, alkali metal and aluminum triethyl, this reaction being otherwise impossible or only possible with difficulties due to the extremely rapidly and readily occurring dissociation in accordance with the equation:

$$4AlR_3 + 3Na \rightarrow Al + 3NaAlR_4$$

These difficulties can be avoided by starting the reaction with a small amount of a monoalkoxy aluminum dialkyl compound and then adding the aluminum trialkyl at a rate which corresponds to the progress of the reaction. Under these circumstances, the exchange reaction $$Na[AlR_3OR'] + AlR_3 \rightarrow AlR_2OR' + Na[AlR_4]$$

will occur continuously so that only the monoalkoxy aluminum dialkyl compound is present in the reaction mixture in uncombined state and is then reconverted into the complex compound and again reacted with free $AlR_3$ during the course of the reaction. Therefore, premature consumption of sodium with formation of aluminum will not occur. Similarly, it is also possible to start the reaction with a small amount of boron alkyl.

In place of the free aluminum trialkyl, it is also possible to use its addition and complex compounds, e.g. with ethers such as tetrahydrofuran or with an alkali halide such as potassium fluoride in the process of the invention.

Moreover, the tendency just mentioned of aluminum trialkyls to undergo decomposition by metallic sodium can be used with great advantage for the process of the invention. As was mentioned above, it is desirable to operate in the presence of finely divided sodium. Very stable suspensions of finely divided sodium metal in inert solvents are obtained if a small amount of an aluminum trialkyl is additionally used in preparing the sodium suspension. In conventionally atomizing finely divided molten sodium, perhaps in a heated hydrocarbon, the sodium metal later shows the tendency to become compacted or, after cooling, to cake together into greater lumps. However, if a small amount of an aluminum trialkyl is added during atomization, the finely divided aluminum which now precipitates exerts an extremely favorable influence on the stability of the sodium suspension even after cooling.

A special embodiment of the process of the invention may be used to incorporate alkyl groups in boric acid esters. The complex compounds which, in accordance with the invention, are to be obtained from boric acid esters are very easily converted with a dilute acid into monoalkyl boric acids which, by esterification and renewed alkylation "by increments" in accordance with the invention, can be converted into dialkyl boric acids and, finally, into boron trialkyls.

An advantageous variant of the process comprises combining the reaction of the invention with the electrolytic decomposition of sodium as described, for example, in U.S. Patent No. 3,234,115 (process for the electrolytic precipitation of sodium). This variant involves covering a layer of liquid sodium amalgam used as the anode with one of the complex compounds to be produced in accordance with the invention and dissolved, if desired, in a solvent such as tetrahydrofuran, placing closely above the amalgam a cathode consisting of a wire net and gradually adding the individual components of the reaction of the invention while simultaneously effecting the electrolysis with vigorous stirring. Under these conditions, the complex compound desired is produced at an increasing rate while sodium is dissolved out of the sodium amalgam and made available to the reaction of the invention.

The reaction products obtained in accordance with the invention are useful compounds which are of great commercial importance within the scope of modern work on organometallic complex compounds. It is to be understood that, in the above description of the invention, the formulae of the products are expressed such as the products are expected to be produced theoretically. It is generally known that the types of compounds described herein are apt to undergo an interchange of alkyl groups or that such exchange products may also be present. Accordingly, the formulae given above are to be understood to empirical formulae of the overall products of the reactions.

A further advantageous modification of the invention consists in that the alkali metal is used in the form of an amalgam which is liquid at the reaction temperature chosen and has a composition on the sodium-rich side of the sodium-mercury melting point diagram. It is known that sodium-poor amalgams having very little up to a maximum of about 0.4% of sodium are liquid at room temperature and, on the other hand, sodium-rich amalgams having, for example, 40% of sodium are also liquid at room temperature. Between these two ranges in which mercury-sodium alloys are liquid at lower temperatures there is a range in which the amalgams are solid and more or less high melting. The highest melting point of sodium amalgam is 355° C. with 4–5% of sodium.

It has been shown in the process of the copending U.S. patent application Serial No. 318,993 that the alkali metal can be used in the form of low sodium liquid amalgams having very low alkali metal contents. This was a surprising observation because it is generally known that the reactivity of alkali metals in amalgams in which mercury predominates is very largely reduced so that it could not be expected that the desired reaction of formation of complex compounds would occur at all in the presence of organoaluminum or organoboron compounds and haloalkyls.

A desirable variant of the present process which will be described hereafter makes also use of a low melting point alkali metal amalgam. However, this amalgam is one which is in the high alkali metal region of the melting point diagram, the alkali metal content of the amalgam being at least 30% by weight. Alkali metal contents, especially sodium contents of from 30 to 60% by weight of the amalgam are preferred. This variant differs in this respect from the process of the copending application Serial No. 318,993 which has also become known in the meantime by several literature publications (German Patent 1,174,779; H. Lehmkuhl, Chem. Ing. Techn., 36, 612 (1964); H. Lehmkuhl, Annals of the New York Academy of Sciences, vol. 125, 124 (1965)). The behavior of high alkali metal amalgams with respect to reactivity is substantially the same as that of the alkali metals themselves and these amalgams may be used in the present process in place of the alkali metals themselves. Nevertheless, the use of the high alkali metal amalgams, especially of sodium amalgam containing 30 to 50% of Na, offers a number of advantages which could hardly be expected. The advantages are particularly obvious in large scale operation and continuous operation. For example, when treating the solution of an alkoxyaluminum dialkyl, e.g. in toluene or tetrahydrofuran or dimethoxydiethyl ether with an excess of 40% sodium amalgam at room temperature and then adding gradually an alkyl halide, the reaction according to the invention will start immediately at room temperature and, for completion, requires at best a short period of gentle heating at the end. The excess of the amalgam will desirably be sufficiently high that the amalgam remains liquid despite the loss in alkali metal. The reaction proceeds extremely smoothly and under very mild conditions and further reaction of the alkyl halide with formation of products of a Wurtz synthesis does not take place and virtually no mercury alkyls are formed.

One reason of the smooth course of using high sodium amalgams is the fact that the alkali metal halide formed does not adhere firmly on the surface of the metal and is continuously rinsed off by the agitated supernatant indifferent liquid thereby laying bare the metal surface. When using only sodium, a similar effect would only occur above 97° C. However, this temperature is excessively high for the reaction according to the invention.

The alkali metal halide produced separates at the interface of the heavy liquid amalgam and the organic medium in the form of a rather heavy, dark colored precipitate. It is only necessary to stir the organic layer gently during the operation and it should be avoided if possible that the liquid amalgam layer is vigorously stirred and thereby suspended. It is readily possible under these conditions to separate the organic layer with the produced alkali metal halide at the end of the reaction. The separation of the excess liquid amalgam may be facilitated by cooling to little below 20° C. and then the liquid upper layer with the suspended alkali metal halide may be removed very easily from the solidified amalgam by siphoning or decantation.

After replenishment of the consumed sodium, the amalgam layer can be readily reused for the next batch. The solid alkali metal halide portion is separated very readily from the organic layer by settling and decantation or by filtration (with exclusion of air). The alkali metal halide contains only very little mercury which can be immediately recovered in the treatment with water. It is readily obvious how a process can be carried out continuously without any difficulty on this basis. The amalgam layer is recirculated between two vessels. In one of these vessels, the reaction proper takes place and the alkali metal is supplied to the other vessel at the rate of being consumed.

*Example 1*

A suspension of 23 g. (1 mole) of sodium in about 400 ml. of toluene is stabilized by introducing methyl chloride at 45° C. Then 121 g. (½ mole) of $Al(O\text{-sec.}C_4H_9)_3$ are slowly added and the introduction of methyl chloride is continued. The temperature is maintained at about 50–55° C. by external cooling. Upon termination of the evolution of heat, the introduction of methyl chloride is continued for about 2 hours at a bath temperature of 55° C. The precipitated sodium chloride is separated by hot filtration, the filtrate is concentrated and the residue heated in an oil bath at 120° C. under a pressure of $10^{-3}$ to $10^{-2}$ mm. Hg until distillation has ceased. The complex compound $Na[Al(O\text{-sec.}—C_4H_9)_3(CH_3)]$ remains as a firm, white, somewhat coherent cake in an amount of 110 g. (78% of the theory) and in an almost pure form.

Calculated: Al, 9.5%; Na, 8.1%. Found: Al, 9.1%; Na, 7.8%.

*Example 2*

A solution of 3 ml. of aluminum triethyl in 50 ml. of toluene is added to a suspension of 23 g. (1 mole) of sodium in toluene at room temperature. In doing so, the surface of the sodium immediately turns dark grey and the suspension becomes stabilized. Then 95 ml. (½ mole) of $Al(C_2H_5)_2(O\text{—}n\text{—}C_4H_9)$ are added. Upon heating of the mixture to 45° C., methyl chloride is introduced into the suspension and the reaction temperature is maintained at 50–55° C. After 4 to 5 hours, the spontaneous reaction is terminated. Then methyl chloride is introduced for additional 2 hours at a temperature of 50° C. This is followed by separation of the precipitated sodium chloride by hot filtration and work-up by the procedure described in Example 1.

Yield: 85 g. 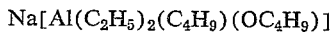 $Na[Al(CH_3)(C_2H_5)_2(O\text{—}n\text{—}C_4H_9)]$ (87% of the theoretical yield).

This product is likewise a solid white powder.
Calculated: Al, 13.7%; Na, 22.7%. Found: Al, 13.0%; Na, 21.1%.

*Example 3*

The procedure is the same as in Example 2 except that 93 g. of n-butyl chloride are added dropwise instead of introducing methyl chloride. Total reaction time is 3 hours.

Yield: 210 g. (82% of the theoretical) of $$Na[Al(C_2H_5)_2(C_4H_9)(OC_4H_9)]$$

(white powder).

Calculated: Al, 11.35%; Na, 9.7%. Found: Al, 10.9%; Na, 9.3%.

*Example 4*

A solution of 3 ml. $Al(C_2H_5)_3$ in 50 ml. of toluene is added to a suspension of 23 g. (1 mole) of sodium and the mixture is allowed to stand while occasionally shaking until the reaction is completed and the sodium suspension has settled. Then the supernatant toluene is removed by siphoning and replaced by 400 ml. of tetrahydrofuran. Thereafter, 85 ml. of $B(OC_2H_5)_3$ (0.5 mole) are slowly added and then ethyl chloride is introduced while thoroughly cooling to prevent the reaction temperature from exceeding 55° C. Upon termination of the reaction, $C_2H_5Cl$ is introduced for additional 1 to 1½ hours at a bath temperature of 50° C. The precipitated sodium chloride is removed by hot filtration and the filtrate is concentrated by evaporation and dried under a high vacuum at 100° C.

Yield: 87 g. (88% of the theoretical) of

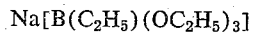 $Na[B(C_2H_5)(OC_2H_5)_3]$ (white powder).

Calculated: B, 5.5%; Na, 11.6%. Found: B, 5.4%; Na, 11.3%.

*Example 5*

$C_2H_5Cl$ was introduced into a suspension of 23 g. of sodium (1 mole) in toluene at 50° C. Then about 5 ml. of $Al(C_2H_5)_2(OC_4H_9)$ were slowly added dropwise. Thereafter a solution of 60 ml. $Al(C_2H_5)_3$ diluted with 40 ml. toluene was very slowly added dropwise at a temperature of 50° C. while simultaneously introducing ethyl chloride. The dropwise addition must be effected such that unreacted $NaC_2H_5$ is always present in the solution so that the sodium metal is incapable of reacting with $Al(C_2H_5)_3$. The reaction is completed after about 6 hours. The precipitated sodium chloride is separated by filtration and the filtrate is concentrated and dried under a high vacuum.

Yield: 74 g. of $NaAl(C_2H_5)_4$ (90% of theory).

*Example 6*

$C_2H_5Cl$ was introduced at 50° C. into a suspension of 23 g. (1 mole) of sodium in 500 ml. of toluene. Then a solution of 70 ml. $Al(C_2H_5)_3$ in 50 ml. of toluene was added dropwise within 4 hours while simultaneously introducing $C_2H_5Cl$. The reaction temperature was always maintained at 50° C. After a total of 6 hours, the sodium chloride was removed by hot filtration, the filtrate was concentrated and dried under high vacuum.

Yield: 74 g. of $NaAl(C_2H_5)_4$ (90% of the theory).

*Example 7*

23 g. of sodium suspension (1 mole)
95 ml. $Al(C_2H_5)_2(OC_4H_9)$ (0.5 mole)
88 g. of n-decyl chloride (0.5 mole)
Solvent: toluene (400 ml.)

The procedure used in carrying out the reaction and work-up are as described in Example 1.

Yield: 150 g. $Na[Al(C_2H_5)_2(n\text{—}C_{10}H_{21})(OC_4H_9)]$ in the form of a yellowish, viscous liquid (90% of the theoretical yield).

*Analysis.*—Calculated: Na, 7.15%; Al, 8.37%. Found: Na, 7.10%; Al, 7.85%.

Example 8

23 g. of sodium suspension (1 mole)
95 ml. of Al($C_2H_5$)$_2$(O$C_4H_9$) (0.5 mole)
56 g. of $C_6H_5$Cl (0.5 mole)
Solvent: toluene (400 ml.)

The procedure is the same as that described in Example 7.

Yield: 110 g. of Na[Al($C_2H_5$)$_2$($C_6H_5$)(O$C_4H_9$)], i.e. 85% of the theoretical yield, the product being solid and of reddish-yellow color.

*Analysis.*—Calculated: Na, 8.9%; Al, 10.4%. Found: Na, 9.1%; Al, 9.8%.

Example 9

The recipe is the same as that described in Example 8 except that Al($C_2H_5$)$_2$ (O-tert—$C_4H_9$) was used.

Yield: 115 g. (89% of the theoretical) of a solid brownish product.

*Analysis.*—Calculated: Na, 8.9%; Al, 10.4%. Found: Na, 8.65%; Al, 9.45%.

Example 10

650 grams of sodium amalgam containing 40.5% of sodium are coated with 250 ml. of predried toluene under nitrogen. After addition of 26 g. (0.2 moles) of ($C_2H_5$)$_2$AlO$C_2H_5$, 18.4 g. (0.2 mole) of n—$C_4H_9$Cl are added dropwise within 1 hour to the slowly stirred amalgam. The reaction starts immediately with separation of sodium chloride and rise in temperature. The temperature is maintained at about 45–50° C. by external cooling. After addition of the n-butyl chloride, the reaction is continued for about another hour at 50° C. while stirring and the mixture is then cooled to about 15° C. The organic phase with the sodium chloride produced (all measures under nitrogen) is separated from the amalgam which is now solid and filtered. The filtrate is concentrated and the residue heated at 100° C. under $10^{-3}$ to $10^{-2}$ mm. Hg in an oil bath until distillate ceases to pass over. The complex compound

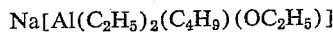
Na[Al($C_2H_5$)$_2$($C_4H_9$)(O$C_2H_5$)]

remains as residue in highly viscous form and crystallizes after several hours.

Yield: 41 g. (98% of the theory).

Calculated: Al, 12.9%; Na, 11.0%. Found: Al, 12.5%; Na, 11.2%.

Example 11

650 grams of sodium amalgam containing 40.5% of sodium are coated with 250 ml. of tetrahydrofuran. After addition of 32 g. (0.2 moles) of Al(O$C_2H_5$)$_3$, 49.4 g. (0.2 moles) of n-dodecyl bromide are added dropwise within 1 hour while slowly stirring the amalgam. The further procedure and processing are as described in Example 10.

Yield: 68 g. (97% of the theory) of

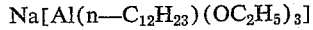
Na[Al(n—$C_{12}H_{23}$)(O$C_2H_5$)$_3$]

as a solid white mass.

Calculated: Al, 7.68%; Na, 6.53%. Found: Al, 7.9%; Na, 6.42%.

Example 12

650 g. of sodium amalgam containing 40.5% sodium
250 ml. of benzene
40 g. (0.2 mole) of $C_2H_5$Al(O$C_4H_9$)$_2$ To the mixture are added dropwise 48 g. (0.2 mole) of 2-ethyl-hexyl iodide at 45° C. The further procedure and processing are as described in Example 10.

Yield: 68 g. (97% of the theory)

Na[Al($C_2H_5$)($C_8H_{17}$)(O$C_4H_9$)$_2$]

as a solid white mass.

Calculated: Al, 7.9%; Na, 6.7%. Found: Al, 7.8%; Na, 7.1%.

Example 13

40 grams of sodium amalgam containing 47% of sodium (m.p. about 40° C.) are covered by 250 ml. of 1,2 - dimethoxy-ethane. Then 29 g. (0.2 mole) of B(O$C_2H_5$)$_3$ are added. After heating to about 45° C., 13 g. (0.2 mole) of $C_2H_5$Cl are introduced into the amalgam which is now liquid. The reaction starts immediately with increase in temperature and separation of sodium chloride. The temperature is maintained at 50° C. by cooling. Due to the decrease in sodium content of the amalgam now starting as the reaction progresses, the reaction temperature could be continuously reduced until the lowest melting point of about 21° C. is reached at a sodium content of about 40%. However, thereafter it would be necessary to heat again continuously since the melting point rises again as the sodium content continues to decrease. However, in the present case, the reaction temperature was maintained at 50° C. Upon completion of the reaction, cooling was effected to 20° C. thereby solidifying the amalgam. The sodium content of the amalgam was about 32%, its melting point about 45° C. Further processing was as described above.

Yield: 38 g. (95% of the theory) of

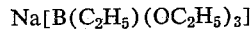
Na[B($C_2H_5$)(O$C_2H_5$)$_3$]

as a white powder.

Calculated: Na, 11.6%; B, 5.5%. Found: Na, 11.7%; B, 5.3%.

Example 14

680 g. of amalgam containing 40% of sodium
250 ml. of 1,2-dimethoxy-ethane
26 g. (0.2 mole) of (CH$_3$)$_2$AlO$C_4H_9$
10.1 g. (0.2 mole) of CH$_3$Cl introduced.

The procedure and processing are as described in Example 10.

Yield: 30 g. (95% of the theory) of

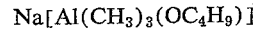
Na[Al(CH$_3$)$_3$(O$C_4H_9$)]

as a solid white mass.

Calculated: Al, 16.1%; Na, 13.7%. Found: Al, 15.8%; Na, 14.1%.

What is claimed is:

1. Process for the production of oxygen-containing alkali metal-organo aluminum complex compounds which comprises reacting at a temperature below 70° C.:
   (a) an alkali metal selected from the group consisting of sodium and potassium;
   (b) an alkyl halide having the formula R″X in which R″ is an alkyl radical having up to 10 carbon atoms and X represents halogen;
   (c) an organo aluminum compound selected from the group consisting of compounds of the formulae Al(OR′)$_3$, AlR(OR′)$_2$ and AlR$_2$OR′ wherein R is alkyl of up to 10 carbon atoms and R′ is alkyl or cycloalkyl to thereby form a complex alkali metal-organo aluminum compound.

2. Process according to claim 1 in which R and R″ represent a lower alkyl radical.

3. Process according to claim 1 in which R′ represents an alkyl radical having up to 10 carbon atoms.

4. Process according to claim 1 in which said reaction is effected in the presence of an organic diluent.

5. Process according to claim 4 in which said diluent is a cyclic ether.

6. Process according to claim 5 in which said cyclic ether is tetrahydrofuran.

7. Process according to claim 1 in which said alkali metal is sodium in the form of a finely divided suspension prepared in the presence of free aluminum trialkyl.

8. Process according to claim 1 in which said alkali metal is reacted in the form of its liquid amalgam with an alkali metal content of at least 30% by weight.

9. Process according to claim 8 in which said liquid amalgam is sodium amalgam with from 30 to 60% of sodium.

10. Process according to claim 8 in which said liquid amalgam is sodium amalgam with from 30 to 50% by weight of sodium.

11. Process according to claim 1 in which said reaction is effected in an electrolytic cell and in which said alkali metal is sodium cathodically deposited in said cell.

12. Process according to claim 1 in which said reaction is effected in the presence of an aluminum trialkyl to thereby form an alkali metal aluminum tetraalkyl complex.

13. Process according to claim 12 in which said alkali metal is sodium.

14. Process according to claim 13 in which R represents the methyl radical.

References Cited
UNITED STATES PATENTS

| | | | |
|---|---|---|---|
| 2,838,556 | 6/1958 | Cattle et al. | 260—448 |
| 3,285,947 | 11/1966 | Ziegler et al. | 260—448 |

TOBIAS E. LEVOW, *Primary Examiner.*

H. M. S. SNEED, *Assistant Examiner.*